United States Patent [19]

Prendergast et al.

[11] Patent Number: 4,686,730
[45] Date of Patent: Aug. 18, 1987

[54] SEMI-AUTOMATIC ARMATURE ASSEMBLY SLOT CLEANER

[75] Inventors: William M. Prendergast, Salem, N.H.; Daniel J. Margolien, Winchester, Mass.

[73] Assignee: Ex-Cell-O Corporation, Walled Lake, Mich.

[21] Appl. No.: 882,055

[22] Filed: Jul. 3, 1986

[51] Int. Cl.⁴ .............................................. B23P 23/00
[52] U.S. Cl. .................................. 15/93 R; 29/27 B; 29/33 L; 409/297
[58] Field of Search ............. 15/93 R; 29/27 B, 33 L, 29/DIG. 7, DIG. 98; 409/297, 298, 301, 302

[56] References Cited

U.S. PATENT DOCUMENTS 3,001,217  9/1961  Tooker ............................... 15/93 R Primary Examiner—Edward L. Roberts
Attorney, Agent, or Firm—John C. Evans

[57] ABSTRACT

An apparatus for cleaning the slots of newly assembled armatures of chips and burrs. The apparatus includes centrally or radially mounted cylinder means and a plurality of radially aligned blades, with suitable linkage means connected threrebetween for moving the blades laterally through the slots upon reciprocal movement of the respective cylinder rod(s) to thereby clean out the slots.

11 Claims, 7 Drawing Figures

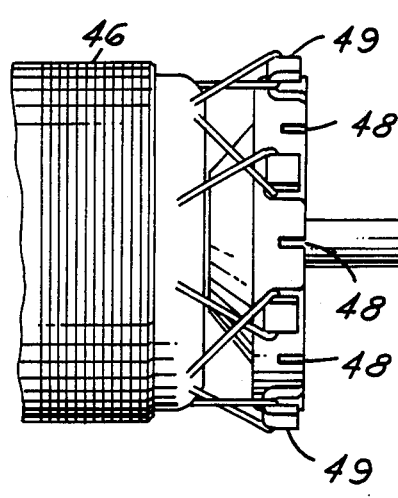
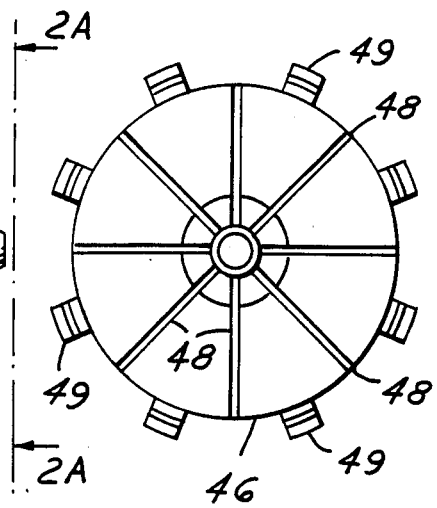
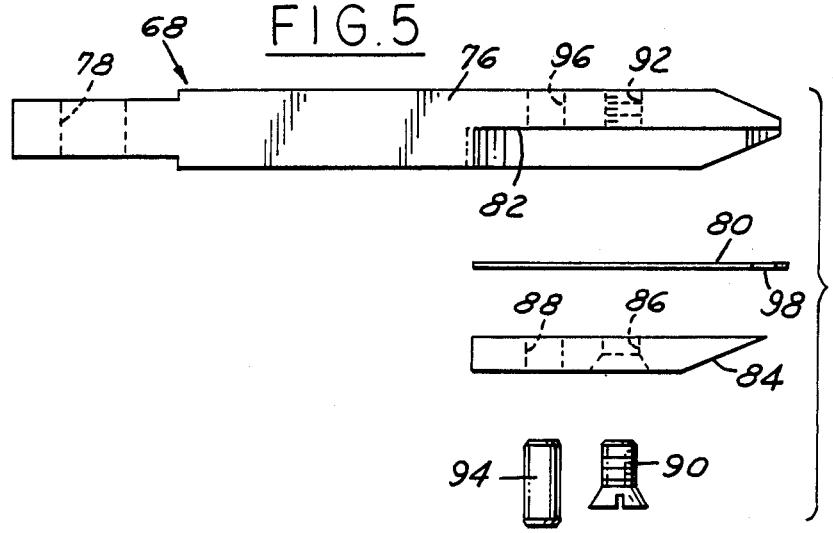
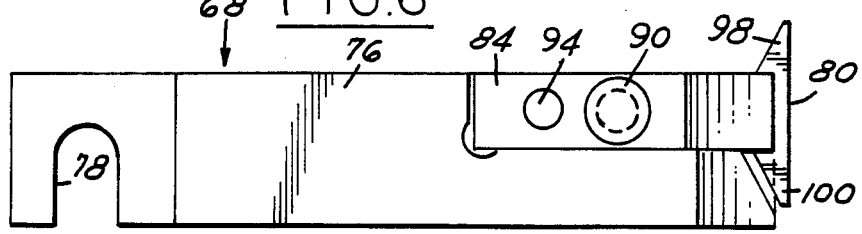

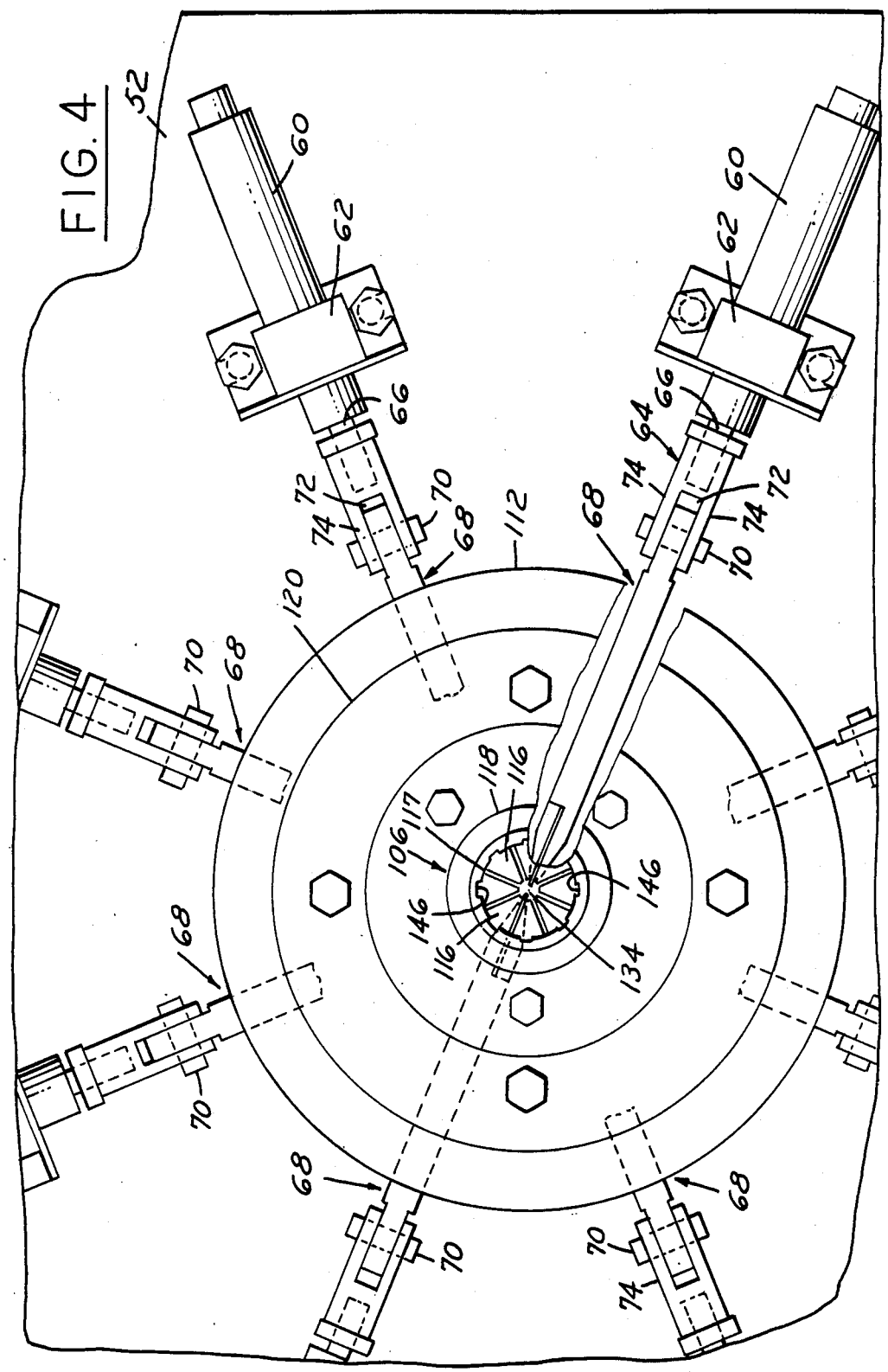

4,686,730

SEMI-AUTOMATIC ARMATURE ASSEMBLY SLOT CLEANER

TECHNICAL FIELD

This invention relates generally to the assembly of armatures and, more particularly, to a device for automatically cleaning chips and burrs from the slots of the armature as a final assembly operation.

BACKGROUND ART

Heretofore, the cleaning of chips and burrs from the slots of newly assembled armatures has been primarily accomplished manually, resulting in a very time-consuming and tedious job.

DISCLOSURE OF THE INVENTION

Accordingly, a general object of the invention is to provide an improved apparatus for automatically cleaning the slots of newly assembled armatures by simply manually inserting each armature into the apparatus.

Another object of the invention is to provide an improved apparatus for simultaneously cleaning all the slots of newly assembled armatures.

A further object of the invention is to provide an apparatus for simultaneously cleaning all the slots of newly assembled armatures, including cylinder actuated bell crank means for projecting a cleaning blade assembly radially outward in the respective slots.

These and other objects and advantages of the invention will be apparent when reference is made to the following description and accompanying drawings.

BRIEF DESCRIPTION OF THE DRAWINGS

FIG. 2 is a fragmentary side elevational view of an armature whose slots are cleaned by the FIG. 1 structure;

FIG. 2A is an end view of the FIG. 2 structure, taken along the plane of the line 2A—2A, and looking in the direction of the arrows;

FIG. 4 is a plan view of the FIG. 1 structure, as if the latter were a full-round figure;

FIG. 5 is an exploded view of a portion of the FIG. 3 structure; and

FIG. 6 is a side elevational view of the FIG. 5 components in an assembled condition.

BEST MODE OF CARRYING OUT THE INVENTION

Figure 1:
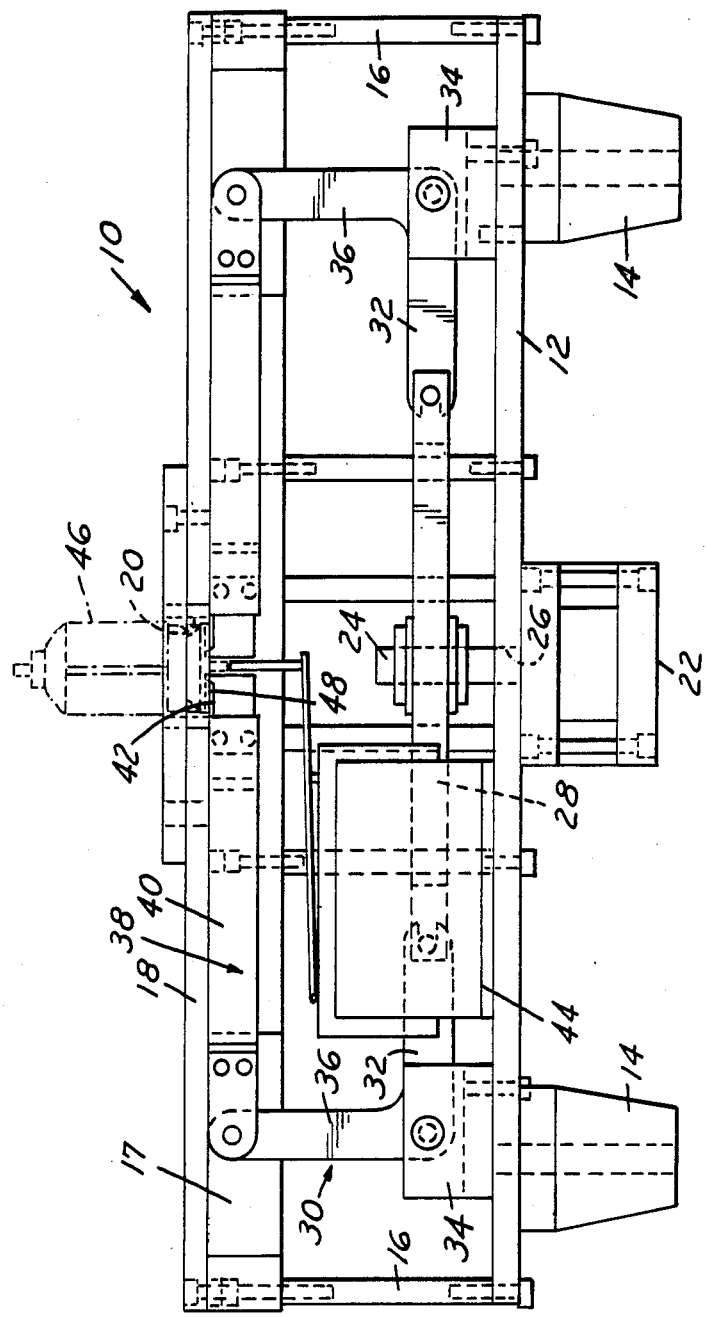
FIG. 1 is a cross-sectional view of an apparatus embodying the invention.

Referring now to the drawings in greater detail, FIG. 1 illustrates an armature slot cleaning mechanism 10 incuding a rectanguar base plate 12 mounted on a plurality of supporting legs 14. Spaced support walls 16 are secured at their lower ends to the periphery of the base plate 12, and a cover member 17 is secured to the upper ends of the support walls 16. A top cover 18 is secured to the cover member 17 and a central opening 20 is formed in the cover member 17.

A cylinder 22 is secured to the under side of the base plate 12, with its cylinder rod 24 extending upwardly through a central opening 26 formed in the base plate 12.

A spider plate 28 is secured to the cylinder rod 24 within the confines of the support walls 16. A plurality of spaced L-shaped bell cranks 30 are secured at the ends of laterally extending legs 32 thereof the outer peripheral edge of the spider plate 28. Each bell crank 30 is pivotally mounted at it bend point in a pivot block 34, with legs 36 extending vertically therefrom. A cleaning blade assembly 38 is pivotally secured to the ends of the vertical legs 36 of the bell cranks 30 just beneath the top cover 18.

The cleaning blade assembly 38 includes a plurality of radially extending arms 40, with upwardly extending blades 42 mounted on the respective inner ends thereof.

Manually operated switch means 44 serves to actuate the cylinder 22. This would occur as soon as the operator places an assembled armature 46, commutator end first, through the opening 20 onto the radially inner ends of the arms 40, with the blades 42 thereby positioned at the respective radially inner ends of the slots 48 of the armature 46. Projections 49 on the commutator end are guided by cooperating vertical slots formed in the wall of the opening 20.

In operation, energizing the switch means 44 causes the cylinder rod 24 of the cylinder 22 to extend upwardly a predetermined distance, say one-half inch, raising the spider plate 28. The resultant upward movement of the spider plate 28 raises the laterally extending legs 32, pivoting them about the pivot blocks 34 and thereby causing the vertically extending legs 36 to pivot radially outwardly. This movement, in turn, pulls the arms 40 radially outwardly, pulling the blades 42 radially outwardly through the respective slots 48 to loosen and clear out chips and burrs therefrom. Vacuum means (not shown) then serves to remove the chips and burrs that have been loosened and cleared from the slots 48.

Figure 3:
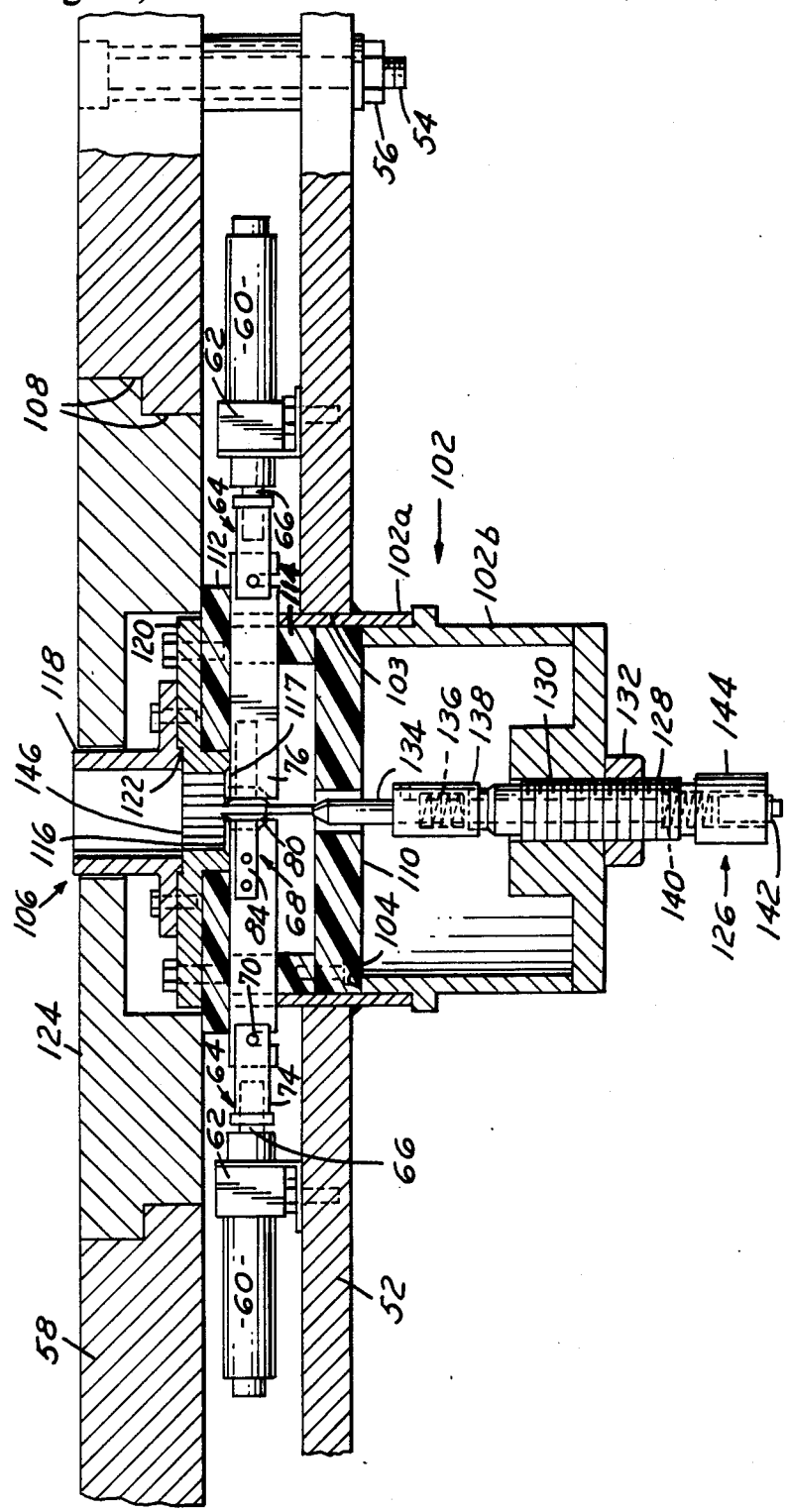
FIG. 3 is a cross-sectional view of an alternate apparatus embodying the invention.

Referring now to FIG. 3, there is shown an alternate armature slot cleaning mechanism 50. The mechanism 50 includes a base plate 52 secured by bolts 54 and nuts 56 to a table top 58. Eight equally radially spaced air cylinders 60 are mounted in brackets 62 on the base plate 52 beneath the table top 58. A clevis 64 is secured to the cylinder rod 66 of each cylinder 60, and a blade assembly 68 is connected to the clevis.

Specifically, the clevis 64 has a pin 70 extended across the space 72 (FIG. 4) between two parallel side wall portions 74. The blade assembly 68 (FIGS. 5 and 6) includes a blade holder 76 having a slot 78 formed in one side thereof adjacent one end for fitting over the pin 70 in the space 72. A blade 80 is confined between a flat recess 82 formed along the other end portion of the blade holder 76 and a blade support member 84, both the blade and the blade support member having aligned openings 86 and 88 formed therethrough. A screw 90 is extended through the openings 86 and threadedly secured to a threaded opening 92 formed in the blade holder 76, and a dowel 94 is press-fitted through the openings 88 and into an opening 96 formed in the blade holder 76.

The blade 80 includes sharp triangular blade extensions 98 and 100 on its distal end so as to be reversible in the blade holder 76 when the first-used extension becomes worn.

A cup-shaped housing 102 (FIG. 3) is secured, as by welding, in a central opening 103 formed in the base plate 52. A ledge or shelf 104 is formed in the housing 102 by virture of the housing being formed of two parts 102a and 102b. The upper portion 102a includes spaced slots formed in its upper edge for the extension therethrough of the respective blade holders 76.

A holding fixture assembly 106 is mounted through a two-diameter opening 108 formed in the table top 58, within the housing portion 102a, so as to sit on the ledge 104.

The assembly 106 includes a base member 110 seated on the ledge 104 of the housing 102. An intermediate member 112 includes a segmented cylindrical extension 114 which fits within an opening 116 in the base member 110. Inwardly extending triangular segments 116 (FIG. 4) are formed in the extension 114, with radial spaces 117 therebetween to accommodate the travel of the blade extensions 98 or 100. An upper or outer cylindrical member 118 includes an outwardly extending flange 120 which is secured to the intermediate member 112, and aligned therewith in a counterbore 122. A cover member 124 is mounted around the members 118 and 120, seated in the two-diameter opening 108 in the table top 58.

A switch assembly 126 includes a sleeve 128 threadedly mounted in a threaded opening 130 formed through the bottom of the housing 102 and retained in position by a nut 132. A shaft 134 extends through the sleeve 128 and held by a spring 136 mounted in a collar 138 and a spring 140 in the sleeve 128 upwardly, away from an electrical switch 142 within a body 144.

As may be noted in FIG. 4, vertical slots 146 may be formed in the inner wall of the intermediate member 112, in line with the centerlines of the triangular segments 116, to guide the particular commutator end projections 49 of the armature assembly so as to align the slots of the armature with the respective blades 80 and their blade extensions 98 and 100.

In operation, the commutator end of an armature is manually inserted through the cylindrical member 118 at the table top 58, and thence into the intermediate member 112, to abut against the shaft 134, pressing it downwardly prior to the commutator end seating upon the triangular segments 116. The downward movement of the shaft 134 against the force of the springs 136 and 140, to engage the switch 142. Energization of the latter causes the cylinders 60 to retract the respective interconnected rods 66, clevises 64, blade holders 76, and blades 80. This movement causes the blade extensions 98 (or 100) to move through the slots of the armature assembly, to thereby loosen and clear any chips and burrs accumulated in the slots from machining operation. The cleaned armature assembly is removed and the blades immediately extend back to their normal radially innermost position. Vacuum means (not shown) then serves to remove the chips and burrs that have been loosened and cleared from the slots.

INDUSTRIAL APPLICABILITY

It should be apparent that the invention provides novel, efficient and economical means for the simultaneous cleaning out of the radial slots of newly machined and assembled armatures, which had heretofore been accomplished one slot at a time manually.

While but two embodiments of the invention have been shown and described, other modifications thereof are possible within the scope of the following claims.

The embodiments of the invention in which an exclusive property privilege is claimed are defined as follows:

1. A cleaning apparatus for cleaning the radial slots of an armature assembly, said cleaning apparatus comprising a base member, cylinder means mounted on said base member and having reciprocally mounted cylinder rod means extending therefrom, a plurality of blades in radial alignment with said radial slots, and linkage means operatively connected between said blades and said cylinder rod means for causing said blades to move through said respective slots upon energization of said cylinder means to loosen and clear out any chips and burrs in the slots.

2. The cleaning apparatus described in claim 1, wherein said linkage means includes a plurality of bell cranks pivotally mounted on said base member, a spider plate connected between said bell cranks and said cylinder rod means for pivoting said bell cranks upon vertical movement of said cylinder rod means, and a cleaning blade assembly including said blades connected to said bell cranks for lateral movement in response to pivotable movement of said bell cranks, to thereby cause said blades to traverse the lengths of said radial slots of said armature.

3. The cleaning apparatus described in claim 2, wherein said bell cranks are L-shaped with laterally extending legs thereof connected to said spider plate and vertically extending legs thereof connected to said cleaning blade assembly.

4. The cleaning apparatus described in claim 3, wherein said cylinder means includes one vertically oriented cylinder with a cylinder rod extending upwardly therefrom.

5. The cleaning apparatus described in claim 4, wherein upward movement of said cylinder rod causes radial outward movement of said respective blades through the pivotable movement of said bell cranks.

6. The cleaning apparatus described in claim 1, wherein said cylinder means includes a plurality of cylinders mounted radially on said base member and having reciprocal cylinder rods extending toward the center of the cleaning apparatus.

7. The cleaning apparatus described in claim 6, wherein said linkage means includes a clevis secured to each said cylinder rod, a pin mounted across said clevis, and a blade holder having a slot for mounting on said pin.

8. The cleaning apparatus described in claim 7, wherein each of said blades includes an upwardly extending blade extension for alignment with said respective radial slots of said armature assembly.

9. The cleaning apparatus described in claim 8, including a holding fixture assembly mounted around a shaft resiliently urged upwardly away from switch means, and wherein manual insertion of said armature assembly forces said shaft downwardly to activate said switch means, causing the energization of said cylinders to pull said blade extensions through said respective radial slots.

10. An armature slot cleaning apparatus comprising a base plate, a plurality of pivot blocks mounted on said base plate, cylinder means secured in a central opening in said base plate and having a reciprocally mounted cylinder rod extending upwardly from said cylinder means, a spider plate secured to said piston rod, a plurality of L-shaped bell cranks pivotally connected at the bend points thereof to the respective blocks and each having its legs extending laterally and vertically therefrom, with the laterally extending legs secured to said spider plate, and a cleaning blade assembly including radially aligned blades operatively connected to said vertically extending legs and adapted to having an armature to be cleaned mounted thereon such that said blades are caused to move radially outwardly through said armature slots in response to vertical movement of said cylinder rod upon energization of said cylinder means.

11. A cleaning apparatus for cleaning the radial slots of an armature assembly, said apparatus comprising a base member, a plurality of radially aligned cylinders mounted of said base member and having respective reciprocal cylinder rods extended toward the center of said assembly, a blade holder secured to each cylinder rod for movement therewith, a blade mounted in each blade holder, an armature holding fixture assembly mounted centrally of said blade holders, switch means for energizing said cylinders mounted below said base plate and axially aligned with said holding fixture assembly, a shaft resiliently mounted above said switch means and adapted to actuate said switch means to energize said cylinders and pull said blades through said radial slots upon manual insertion of said armature assembly into said holding fixture assembly.

* * * * *